United States Patent [19]

Nachbur et al.

[11] 3,901,985
[45] Aug. 26, 1975

[54] PROCESS FOR THE MANUFACTURE OF CONDENSATION PRODUCTS CONTAINING PHOSPHORUS, THE PRODUCTS AND THEIR USE AS FLAMEPROOFING AGENTS

[75] Inventors: Hermann Nachbur, Dornach; Arthur Maeder, Therwil, both of Switzerland

[73] Assignee: Ciba-Geigy AG, Basel, Switzerland

[22] Filed: Aug. 31, 1972

[21] Appl. No.: 285,174

[30] Foreign Application Priority Data
Sept. 10, 1971 Switzerland............ 13308/71
Jan. 14, 1972 Switzerland............ 517/72

[52] U.S. Cl. ......... 427/390; 260/251 P; 260/309.7; 260/606.5 P
[51] Int. Cl. ............................. C09d 1/00
[58] Field of Search ...... 117/136, 138.8 F, 139.5 A, 117/143 A; 260/309.7, 606.5 P, 251 P

[56] References Cited
UNITED STATES PATENTS

| | | | |
|---|---|---|---|
| 2,809,941 | 10/1957 | Reeves et al. | 260/2 |
| 3,310,420 | 3/1967 | Wagner | 117/62.2 |
| 3,421,923 | 1/1969 | Guth | 117/136 X |
| 3,428,480 | 2/1969 | Wagner et al. | 117/136 |
| 3,669,725 | 6/1972 | Nachbar et al. | 117/136 |
| 3,681,124 | 8/1972 | Sello et al. | 117/136 |
| 3,690,941 | 9/1972 | Reuter et al. | 117/136 |

FOREIGN PATENTS OR APPLICATIONS
884,785   12/1961   United Kingdom

*Primary Examiner*—Michael R. Lusignan
*Attorney, Agent, or Firm*—Joseph G. Kolodny; Prabodh I. Almaula; Edward McC. Roberts

[57] ABSTRACT

The subject of the invention is a process for the manufacture of condensation products of hydroxymethylphosphonium compounds and a cyclic urea, characterized in that (a) 1 mol of a tetrakis-(hydroxymethyl)-phosphonium compound is condensed at 40° to 120°C with (b) 0.02 to 0.5 mol, preferably 0.1 to 0.3 mol, of an optionally N-methylolated monocyclic or bicyclic urea, which has 5 to 6 members per ring, optionally in the presence of formaldehyde or a formaldehyde-releasing agent and optionally in the presence of an inert organic solvent, if appropriate, condensation is thereafter continued at 100° to 150°C and if appropriate free hydroxyl groups are at least partially etherified with at least one alkanol with 1 to 4 carbon atoms and if appropriate the salts of the polycondensation products are converted into the corresponding hydroxides.

The condensation products are used for flameproofing organic fibre material, in particular textiles.

14 Claims, No Drawings

PROCESS FOR THE MANUFACTURE OF CONDENSATION PRODUCTS CONTAINING PHOSPHORUS, THE PRODUCTS AND THEIR USE AS FLAMEPROOFING AGENTS

The subject of the invention is a process for the manufacture of condensation products of hydroxymethylphosphonium compounds and a cyclic urea, characterised in that (a) 1 mol of a tetrakis-(hydroxymethyl)-phosphonium compound is condensed to 40° to 120°C with (b) 0.02 to 0.5 mol, preferably 0.1 to 0.3 mol, of an optionally N-methylolated monocyclic or bicyclic urea, which has 5 to 6 members per ring, optionally in the presence of formaldehyde or a formaldehyde-releasing agent and optionally in the presence of an inert organic solvent, if appropriate, condensation is thereafter continued at 100° to 150°C and if appropriate free hydroxyl groups are at least partially etherified with at least one alkanol with 1 to 4 carbon atoms and if appropriate the salts of the polycondensation products are converted into the corresponding hydroxides.

The condensation is preferably carried out at 70° to 110°C in an inert organic solvent or solvent mixture. For this aromatic hydrocarbons are above all suitable, such as, for example, toluene, o-, m- or p-xylene or a mixture thereof, or xylene-toluene, xylene-benzene or xylene-decahydronaphthalene mixtures. Preferably the further condensation which may follow subsequently is carried out at 125° to 140°C or especially at about 135°C, that is to say at the boiling point of the solvent or solvent mixture.

At the same time it is however also possible to carry out the condensation in the absence of an inert organic solvent, for example if condensation product already manufactured is used as the solvent or if condensation is carried out in the melt.

An appropriate procedure is to heat the tetrakis-(hydroxymethyl)-phosphonium compound, which as a rule is in the form of an aqueous solution, together with the component (b), optionally in a solvent, to the boil, and to distil off the water.

The tetrakis-(hydroxymethyl)-phosphonium compounds are, above all, the salts and the hydroxide.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where tetrakis-(hydroxymethyl)-phosphonium hydroxide (THPOH) is used as the starting product, it is appropriately prepared beforehand from a corresponding salt, for example THPC, by neutralisation in aqueous solution, preferably at a pH value of 7 to 7.5, with a base, for example sodium hydroxide, and subsequent dehydration.

Suitable cyclic ureas correspond for example to the optionally methylolated compounds of the formula (1) 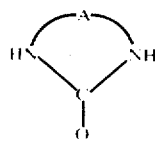

wherein A denotes an alkylene radical with 2 or 3 carbon atoms in the chain, optionally substituted by hydroxyl, lower alkyl, lower alkoxy or lower alkoxyalkoxy, or wherein A denotes a lower N-alkylamino-N,N-dimethylene radical or a 4,5-ethyleneurea radical.

Lower alkyl and alkoxy usually contain at the most 4 carbon atoms, for example methyl, ethyl, isopropyl, n-butyl, methoxy, ethoxy, n-propoxy or tert. butoxy. Appropriately, lower alkoxyalkoxy contains at most 4 carbon atoms in each of the two alkoxy radicals.

These cyclic ureas are preferably optionally N-methoylolated compounds of the formula (2) 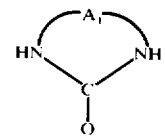

wherein $A_1$ represents a radical of the formula (2.1) $-CH_2CH_2-$
(2.2) $-CH_2CH_2CH_2-$
(2.3) $-CHOH-CHOH-$
(2.4) $-CHOX-CYZ-CH_2-$
(2.5) $-CH_2-NR-CH_2-$
(2.6) or

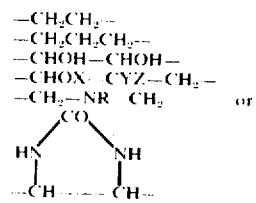

wherein X denotes hydrogen, alkyl with 1 to 4 carbon atoms, hydroxyalkyl with 2 to 4 carbon atoms or alkoxyalkyl with 1 to 4 carbon atoms in the alkoxy part and 2 to 4 carbon atoms in the alkyl part, Y and Z each denote alkyl with 1 to 4 carbon atoms, and R denotes alkyl or hydroxyalkyl with 1 to 4 carbon atoms.

The component (b) can thus be used in the N-methylolated or non-methylolated form. Simple cyclic ureas, such as the ethyleneurea, propyleneurea or acetylenediurea, are preferably employed in the non-methylolated form. On the other hand, substituted ureas, such as, for example, glyoxalurea, 4-methoxy-5,5-dimethylhexahydropyrimidone-2 or N-ethyltriazone, are preferably used in the form of their methylol compounds, that is to say preferably in the form of N,N'-dimethylol compounds.

The N-alkyltriazones correspond, for example, to the formula (3) 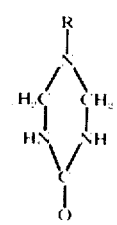

wherein R denotes alkyl or hydroxyalkyl with 1 to 4 carbon atoms. Preferably, R in the formulae (2.5) and (3) represents ethyl.

The hexahydropyrimidones correspond preferably to the formula

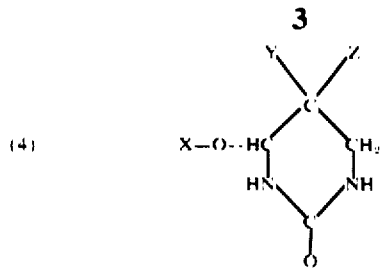

(4)

wherein X, Y and Z have the indicated meaning. Preferably, however, X, Y and Z in formulae (2.4) and (4) each denotes a methyl radical.

Amongst the cyclic ureas, ethyleneurea is especially preferred.

Where formaldehyde is optionally used conjointly it is preferably present as an aqueous solution. Paraformaldehyde is particularly suitable as a formaldehyde-releasing agent.

Where a condensation product, which still contains free hydroxyl groups, is optionally etherified, this is carried out for example with n-butanol, n-propanol, ethanol or especially methanol. This is preferably carried out in an acid medium.

The acid catalysts optionally used conjointly in the condensation are preferably salts which have an acid action (Lewis acids), such as magnesium chloride, iron-III chloride, zinc nitrate or boron trifluoride/diethyl ether. The conjoint use of these catalysts is especially advisable in the autocondensation of THPOH.

After completion of the condensation and the optional etherification, the salts of the condensation products can also be completely or partially converted into their corresponding hydroxides, which is as a rule effected by adding strong bases such as alkali metal hydroxides or alkaline earth metal hydroxides, for example sodium hydroxide, potassium hydroxide or calcium hydroxide, or also sodium carbonate. The amount of base is appropriately so chosen that the pH value of the reaction mixture is about 5 to 8. Appropriately, this conversion is carried out in the bath used for application.

At times, the end products show an unpleasant odour caused by volatile, low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agents such as hydrogen peroxide or potassium persulphate.

The condensation products are used for flameproofing organic fibre material, in particular textiles. For this, an appropriate procedure is to apply to these materials an aqueous preparation which contains at least 1) a condensation product of the indicated type and 2) a polyfunctional compound which differs from the condensation products according to 1), and to finish the materials treated in this way by the moist batch, wet batch, or above all the ammonia or, especially, the thermofixing process.

The component 2) is preferably a polyfunctional epoxide or above all a polyfunctional nitrogen compound. Possible epoxides are above all epoxides which are liquid at room temperature and have at least two epoxide groups, which are preferably derived from polyhydric phenols. Polyfunctional nitrogen compounds are, for example, polyalkylene-polyamines or especially compounds which form aminoplasts, or aminoplast precondensates. The latter are preferred.

By compounds which form aminoplasts there are understood nitrogen compounds which are methylolated and by aminoplast precondensates there are understood addition products of formaldehyde to nitrogen compounds which can be methylolated. As compounds which form aminoplasts or as nitrogen compounds which can be methylolated, there may be mentioned:

1,3,5-Aminotriazines such as N-substituted melamines, for example N-butylmelamine, N-trihalogenomethylmelamines, triazones and ammeline, guanamines, for example benzoguanamines and acetoguanamines or also diguanamines.

Further possibilities are: cyanamide, acrylamide, an alkylurea or an arylurea and alkylthioureas or arylthioureas, alkyleneureas or alkylenediureas, for example, urea, thiourea, urones, triazones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the radical -CH$_2$CH$_2$CO—NH—CH$_2$OH. The methylol compounds of a urea, of an ethyleneurea or, especially, of melamine are preferentially used. Valuable products are in general given by products which are as highly methylolated as possible but in particular also by products with low methylolation. Etherified or non-etherified methylolmelamines are particularly suitable, such as dimethylolmelamine, trimethylolmelamine or mixtures thereof. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol isopropanol, n-butanol or pentanols are advantageous. It is, however, desirable that these aminoplast precondensates should be water-soluble, such as, for example, pentamethylolmelamine-dimethyl-ether or trimethylolmelamine-dimethyl-ether.

The organic fibre materials which are to be provided with a flameproof finish are, for example, wool, paper, furs, hides or preferably textiles. In particular fibre materials of polyamides, cellulose, cellulose-polyester or polyester are rendered flameproof in which case fabrics of wool, polyester or especially mixed fabrics of polyester-cellulose, wherein the ratio of the polyester constituent to the cellulose constituent is 1:4 to 2:1 are preferred. It is thus possible to use, for example, so-called 20/80, 26/74, 50/50 or 67/33 polyester-cellulose mixed fabrics.

The cellulose or the cellulose constituent of the fibre material originates, for example, from linen, cotton, rayon or staple viscose. In addition to polyester-cellulose fibre mixtures, fibre mixtures of cellulose with natural or synthetic polyamides can also be used. Above all it is also possible to render fibre materials of wool flameproof successfully with the polycondensation products.

The aqueous preparations for flameproofing the organic fibre materials as a rule contain 200 to 800 g/l, preferably 350 to 700 g/l, especially also 200 to 600 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of substance on fabrics it is advantageous, for example, to add 0.1 to 0.5% of a high molecular polyethylene glycol. Furthermore, the customary plasticisers can be added to the preparations, for example an aqueous polyethylene emulsion or silicone oil emulsion.

To improve the mechanical strengths of the fibres it is also possible to add to the preparations suitable copolymers, for example copolymers of N-methylolacrylamide or also cationic copolymers. Advantageous for this purpose are, for example, aqueous emulsions of copolymers of a) 0.25 to 10 percent of an alkaline earth metal salt of an $\alpha,\beta$-ethylenically unsaturated monocarboxylic acid, b) 0.25 to 30 percent of a N-methylolamide or N-methylolamide-ether of an $\alpha,\beta$-ethylenically unsaturated monocarboxylic or dicarboxylic acid and c) 99.5 to 60 percent of at least one other copolymerisable compound.

These copolymers and their manufacture are known. The tear strength and abrasion resistance of the treated fibre material can be favourably influenced by the conjoint use of such a copolymer.

If a polymer of the indicated type is also added to the preparation, it is advantageously added in small amounts, for example 1 to 10 percent relative to the amount of the condensation product. The same is true of any plasticiser, where the appropriate amounts can again be 1 to 10 percent.

It is also possible to add curing catalysts, such as, for example, ammonium chloride, ammonium dihydrogen orthophosphate, phosphoric acid, magnesium chloride or zinc nitrate, but is in most cases not necessary.

The pH value of the preparations is as a rule 2 to 7.5, preferably 4 to 7, and is adjusted in the usual manner by adding acid or base.

It can also be advantageous to add buffer substances, for example $NaHCO_3$, disodium and trisodium phosphate or triethanolamine.

To improve the durability of the flameproof finishes and to achieve a soft handle it can be advantageous to add, to the aqueous preparations, halogenated paraffins in combination with a polyvinyl halide compound.

The preparations are now applied to the fibre materials, which can be done in a manner which is in itself known. Preferably, piece goods are used, and these are impregnated on a padder which is fed with the preparation at room temperature.

In the preferred thermofixing process, the fibre material impregnated in this way must now be dried and subjected to a heat treatment. Drying is appropriately carried out at temperatures of up to 100°C. Thereafter the material is subjected to a heat treatment at temperatures above 100°C, preferably 100° to 200°C, preferably 120° to 180°C, the duration of which can be the shorter the higher is the temperature. This duration of heating is, for example, 30 seconds to 10 minutes.

It is, however, also possible to use the ammonia fixing process or moist fixing process or the wet fixing process.

If the moist fixing process is used, the fabric is first dried to a residual moisture of about 5 to 20 percent and is thereafter stored for 12 to 48 hours at about 40° to 60°C, rinsed, washed and dried. In the wet fixing process a similar procedure is followed, except that the completely wet fibre material is stored. In the ammonia fixing process, the treated fibre material is first gas-treated with ammonia whilst moist and is subsequently dried.

A rinse with an acid-binding agent, preferably with aqueous sodium carbonate solution, can be appropriate in the case of a strongly acid reaction medium.

In the examples which follow, the percentages and parts are percentages by weight and parts by weight, respectively. The relationship of parts by volume to parts by weight is as of ml to g.

EXAMPLE 1

244 parts of a 78 percent strength aqueous THPC solution (1 mol), 43 parts of ethyleneurea (0.5 mol) and 200 parts of xylene isomer mixture are heated to the boil, with rapid stirring, in a stirred vessel of 500 parts by volume capacity, which is provided with a water separator and thermometer. At a boiling point of 102°C, the azeotropic removal of the water from the aqueous THPC solution commences. After this water has been removed, the boiling point gradually rises to 134°C, in the course of which further water, which has been formed by condensation, is obtained. In total, 80 parts of water are obtained. The reaction product forms a highly viscous mass and is cooled to 90°C, after which the product is dissolved by adding 200 parts of water. The xylene is largely separated off and the aqueous solution is completely evaporated in vacuo at about 70°C.

200 parts of a yellow, highly viscous product are obtained and are diluted with water to 80 percent active substance content to facilitate handling. The infrared spectrum of this product shows the following bands:

| | | | | |
|---|---|---|---|---|
| Broad | band at approx. | 3,840 | cm⁻¹ | strong |
| Sharp | " | 2,900 | " | weak |
| Broad shoulder | " | 2,850 | " | medium |
| Broad shoulder | " | 2,640 | " | medium |
| Broad shoulder | " | 2,470 | " | weak |
| Broad shoulder | " | 2,350 | " | weak |
| Sharp | " | 2,070 | " | weak-medium |
| Broad | " | 1,670 | " | strong |
| Sharp | " | 1,490 | " | medium strong |
| Broad | " | 1,440 | " | weak |
| Sharp shoulder | " | 1,390 | " | weak-medium |
| Sharp shoulder | " | 1,300 | " | weak-medium |
| Broad | " | 1,265 | " | weak |
| Sharp | " | 1,205 | " | weak |
| Broad | " | 1,155 | " | weak |
| Sharp | " | 1,095 | " | weak |
| Sharp | " | 1,040 | " | medium |
| Broad | " | 910 | " | medium |
| Sharp | " | 750 | " | weak |

EXAMPLE 2

244 parts of a 78 percent strength aqueous solution of THPC (1 mol) and 43 parts of ethyleneurea (0.5 mol) are treated for 2 hours at 100° to 110°C internal temperature in a stirred vessel of 500 parts by volume capacity, which is equipped with a thermometer and reflux condenser. After cooling to room temperature, a yellow, low viscosity solution of the condensation product, containing 75 percent of active substance, is obtained.

The infrared spectrum of this product shows the following bands:

| | | | | |
|---|---|---|---|---|
| Broad | band at approx. | 3,200 | cm⁻¹ | strong |
| Sharp | " | 2,910 | " | weak |
| Broad shoulder | " | 2,850 | " | medium |

-Continued

| | | | | |
|---|---|---|---|---|
| Broad shoulder | " | 2,630 | " | medium |
| Broad shoulder | " | 2,460 | " | weak |
| Broad shoulder | " | 3,350 | " | weak |
| Sharp | " | 2,070 | " | weak |
| Broad | " | 1,690 | " | strong |
| Broad shoulder | " | 1,640 | " | medium |
| Sharp | " | 1,495 | " | medium |
| Broad | " | 1,440 | " | weak |
| Sharp shoulder | " | 1,390 | " | weak-medium |
| Broad | " | 1,270 | " | medium |
| Broad | " | 1,205 | " | weak |
| Sharp | " | 1,105 | " | weak |
| Sharp | " | 1,040 | " | medium-strong |
| Sharp shoulder | " | 910 | " | medium |
| Broad shoulder | " | 880 | " | weak |
| Sharp | " | 750 | " | weak |

EXAMPLE 3

244 parts of a 78 percent strength aqueous solution of THPC (1 mol of THPC) and 50 parts of propyleneurea (0.5 mol) are treated for 2 hours at 100°C internal temperature in a stirred vessel of 500 parts by volume capacity which is equipped with a thermometer and reflux condenser. Thereafter the mixture is cooled to room temperature and 293 parts of a clear colourless solution containing 81.6 percent of active substance are obtained. The infrared spectrum of this product shows the following bands:

| | | | | |
|---|---|---|---|---|
| Broad | band at approx. | 3,240 cm⁻¹ | strong |
| Sharp | " | 2,920 | " | weak |
| Broad shoulder | " | 2,850 | " | medium |
| Broad shoulder | " | 2,630 | " | weak-medium |
| Broad shoulder | " | 2,470 | " | weak |
| Broad shoulder | " | 2,350 | " | weak |
| Sharp | " | 3,030 | " | weak-medium |
| Broad | " | 1,640 | " | strong |
| Broad | " | 1,535 | " | medium |
| Sharp shoulder | " | 1,450 | " | weak-medium |
| Broad | " | 1,410 | " | weak-medium |
| Sharp | " | 1,320 | " | weak-medium |
| Sharp | " | 1,395 | " | weak-medium |
| Sharp | " | 1,215 | " | weak-medium |
| Broad shoulder | " | 1,190 | " | weak |
| Broad shoulder | " | 1,165 | " | weak |
| Sharp | " | 1,110 | " | weak |
| Broad | " | 1,045 | " | medium |
| Sharp shoulder | " | 950 | " | weak-medium |
| Sharp shoulder | " | 910 | " | weak-medium |
| Broad shoulder | " | 880 | " | weak-medium |
| Sharp | " | 750 | " | weak-medium |

EXAMPLE 4

244 parts of a 78 percent strength aqueous solution of THPC (1 mol of THPC) and 35.5 parts (0.25 mol) of an acetylenediurea are treated for 2 hours at 100°C internal temperature in a stirred vessel of 500 parts by volume capacity which is equipped with a thermometer and reflux condenser. 279 parts of a colourless low viscosity solution which contains 89.6 percent of active substance are obtained. The infrared spectrum of this product shows the following bands:

| | | | | |
|---|---|---|---|---|
| Broad | band at approx. | 3,240 cm⁻¹ | strong |

-Continued

| | | | | |
|---|---|---|---|---|
| Sharp | " | 2,910 | " | weak |
| Broad shoulder | " | 2,850 | " | medium |
| Broad shoulder | " | 2,620 | " | medium |
| Broad shoulder | " | 2,470 | " | weak |
| Broad shoulder | " | 2,350 | " | weak |
| Sharp | " | 2,070 | " | weak-medium |
| Broad | " | 1,670 | " | strong |
| Broad shoulder | " | 1,645 | " | medium |
| Broad | " | 1,470 | " | medium-strong |
| Broad | " | 1,410 | " | weak-medium |
| Sharp | " | 1,295 | " | weak |
| Sharp shoulder | " | 1,245 | " | weak |
| Broad shoulder | " | 1,210 | " | weak |
| Sharp | " | 1,105 | " | weak |
| Sharp | " | 1,040 | " | medium-strong |
| Sharp shoulder | " | 910 | " | medium |
| Broad shoulder | " | 875 | " | weak-medium |
| Broad shoulder | " | 755 | " | weak |

EXAMPLE 5

244 parts of a 78 percent strength aqueous solution of THPC (1 mol of THPC) and 222.5 parts (0.5 moles) of a 40 percent strength aqueous solution of N,N'-dimethylol-glyoxalurea are treated for 2 hours at 100° to 105°C internal temperature in a stirred vessel of 500 parts by volume capacity which is equipped with a thermometer and reflux condenser. Thereafter the mixture is cooled to room temperature and 463 parts of a yellow-red low viscosity solution containing 56 percent of active substance are obtained. The infrared spectrum of this product shows the following bands:

| | | | | |
|---|---|---|---|---|
| Broad | band at approx. | 3,250 cm⁻¹ | strong |
| Sharp | " | 2,910 | " | weak |
| Broad shoulder | " | 2,850 | " | medium |
| Broad shoulder | " | 2,640 | " | weak-medium |
| Broad shoulder | " | 2,350 | " | weak |
| Sharp | " | 2,070 | " | weak |
| Broad | " | 1,710 | " | strong-medium |
| Broad shoulder | " | 1,640 | " | medium-weak |
| Broad | " | 1,470 | " | medium |
| Broad | " | 1,310 | " | weak |
| Broad | " | 1,240 | " | weak |
| Sharp | " | 1,160 | " | weak |
| Sharp | " | 1,040 | " | medium |
| Broad | " | 900 | " | weak-medium |
| Sharp shoulder | " | 750 | " | weak |

EXAMPLE 6

244 parts of a 78% strength aqueous solution of THPC (1 mol of THPC) and 218 parts (0.5 mol) of a 50 percent strength aqueous solution of N,N'-dimethylol-4-methoxy-5,5-dimethylhexahydropyrimidone-2 are treated for 2 hours at 100°C internal temperature in a stirred vessel of 500 parts by volume capacity which is equipped with a thermometer and reflux condenser. Thereafter the mixture is cooled to room temperature and 460 parts of a clear low viscosity solution containing 61.7 percent of active substance are obtained. The infrared spectrum of this product shows the following bands:

| | | | | |
|---|---|---|---|---|
| Broad | band at approx. | 3,240 cm⁻¹ | strong |
| Sharp | " | 2,910 | " | weak |
| Broad shoulder | " | 2,850 | " | medium |
| Broad shoulder | " | 2,630 | " | weak |

-Continued

| | | | | |
|---|---|---|---|---|
| Broad shoulder | " | 2,470 | " | medium weak |
| Broad shoulder | " | 2,350 | " | weak |
| Sharp | " | 2,070 | " | weak |
| Broad | " | 1,650 | " | strong |
| Broad | " | 1,500 | " | medium-weak |
| Broad | " | 1,405 | " | weak |
| Broad shoulder | " | 1,300 | " | weak |
| Broad | " | 1,245 | " | weak |
| Broad shoulder | " | 1,195 | " | weak |
| Sharp shoulder | " | 1,105 | " | weak |
| Broad | " | 1,040 | " | weak-medium |
| Broad | " | 900 | " | weak-medium |
| Sharp | " | 755 | " | weak |

EXAMPLE 7

244 parts of a 78 percent strength aqueous solution of THPC (1 mol of THPC) and 255 parts (0.5 mol) of a 40 percent strength aqueous solution of N,N'-dimethylol-N''-ethyltriazone are treated for 2 hours at 100°C internal temperature in a stirred vessel of 500 parts by volume capacity which is equipped with a thermometer and reflux condenser. Thereafter the solution is concentrated in vacuo at 60°C to an active substance content of 95 percent.

296 parts of a highly viscous, clear yellow product are obtained. The infrared spectrum of this product shows the following bands:

| | | | | |
|---|---|---|---|---|
| Broad | band at approx. | 3,240 cm⁻¹ | strong |
| Broad shoulder | " | 2,910 | " | weak |
| Broad shoulder | " | 2,850 | " | weak |
| Broad shoulder | " | 2,650 | " | weak |
| Broad shoulder | " | 2,480 | " | weak |
| Broad shoulder | " | 2,350 | " | weak |
| Sharp shoulder | " | 2,070 | " | weak-medium |
| Broad shoulder | " | 1,700 | " | strong |
| Broad shoulder | " | 1,650 | " | weak |
| Broad | " | 1,540 | " | weak |
| Broad shoulder | " | 1,400 | " | weak |
| Broad shoulder | " | 1,300 | " | weak |
| Broad shoulder | " | 1,245 | " | weak |
| Broad shoulder | " | 1,105 | " | weak |
| Broad | " | 1,035 | " | weak |
| Broad | " | 895 | " | weak |

EXAMPLE 8

190.5 parts (1 mol) of anhydrous crystalline THPC and 1.72 parts (0.02 mol) of ethyleneurea are condensed in the melt at 115°C for 2 hours, in a stirred vessel of 500 parts by volume capacity which is equipped with a thermometer and reflux condenser. Thereafter the mixture is cooled to 50°C, 80 parts of methanol and 0.1 part of 37 percent strength aqueous hydrochloric acid are added and the mixture is etherified for 30 minutes at the reflux temperature (65°–66°C). It is then cooled to 60°C and the excess methanol is removed in vacuo. 191 parts of a viscous condensation product are obtained. The infrared spectrum of this product shows the following bands:

| | | | | |
|---|---|---|---|---|
| Broad | band at approx. | 3,240 cm⁻¹ | strong |
| Sharp | " | 2,920 | " | weak |
| Broad shoulder | " | 2,850 | " | weak-medium |
| Broad shoulder | " | 2,630 | " | weak-medium |
| Broad shoulder | " | 2,460 | " | weak |
| Broad shoulder | " | 2,340 | " | weak |
| Sharp | " | 2,070 | " | weak |
| Broad | " | 1,630 | " | medium |
| Broad shoulder | " | 1,500 | " | weak |
| Broad | " | 1,415 | " | medium |
| Sharp | " | 1,300 | " | weak |
| Broad shoulder | " | 1,260 | " | weak |
| Broad | " | 1,800 | " | weak |
| Sharp shoulder | " | 1,165 | " | weak |
| Broad shoulder | " | 1,100 | " | weak |
| Sharp | " | 1,040 | " | medium-strong |
| Sharp shoulder | " | 915 | " | medium |
| Broad shoulder | " | 875 | " | weak-medium |

EXAMPLE 9

244 parts of an aqueous 78 percent strength THPC solution (1 mol), 30 parts of propyleneurea (0.3 mol) and 51 parts of an aqueous 35.4 percent strength formaldehyde solution (0.6 mol) are condensed for 2 hours at 100°–105°C internal temperature in a stirred vessel of 500 parts by volume capacity which is equipped with a thermometer and reflux condenser. After cooling, 324 parts of a low viscosity clear solution of the condensation product, containing 9.6 percent of phosphorus, are obtained. The infrared spectrum shows the following bands:

| | | | | |
|---|---|---|---|---|
| Broad | band at approx. | 3,240 cm⁻¹ | strong |
| Broad shoulder | " | 2,910 | " | weak |
| Broad shoulder | " | 2,840 | " | medium |
| Broad shoulder | " | 2,630 | " | medium |
| Broad shoulder | " | 2,480 | " | weak |
| Broad shoulder | " | 2,350 | " | weak |
| Sharp | " | 2,070 | " | medium |
| Broad | " | 1,610 | " | strong |
| Broad | " | 1,520 | " | weak-medium |
| Broad | " | 1,405 | " | weak-medium |
| Sharp shoulder | " | 1,320 | " | weak-medium |
| Broad | " | 1,295 | " | weak |
| Sharp shoulder | " | 1,210 | " | weak |
| Broad shoulder | " | 1,160 | " | weak |
| Sharp shoulder | " | 1,105 | " | weak |
| Broad | " | 1,040 | " | weak-medium |
| Broad | " | 900 | " | weak-medium |
| Sharp shoulder | " | 750 | " | weak |

EXAMPLE 10

244 parts of a 78 percent strength aqueous solution of THPC (1 mol) are neutralised to a pH value of 7.2 with 46.6 parts of 30 percent strength aqueous sodium hydroxide solution in a stirred vessel of 500 parts by volume capacity which is equipped with a thermometer and reflux condenser, and thereafter 43 parts of ethyleneurea (0.5 mol) are added. Condensation is then carried out for 2 hours at 100°–110°C internal temperature. Thereafter the mixture is cooled to room temperature.

320 parts of a mobile solution of the condensation product, containing 20.5 parts of NaCl, are obtained. The phosphorus content is 9.7 percent. The infrared spectrum of this product shows the following bands:

| | | | | |
|---|---|---|---|---|
| Broad | band at approx. | 3,240 cm⁻¹ | strong |
| Broad shoulder | " | 2,900 | " | weak |
| Broad shoulder | " | 2,850 | " | medium |
| Broad shoulder | " | 2,630 | " | weak-medium |
| Broad shoulder | " | 2,470 | " | weak |
| Broad shoulder | " | 2,350 | " | weak |
| Sharp | " | 2,070 | " | weak-medium |

| | -Continued | | |
|---|---|---|---|
| Broad | " | 1,670 | " strong |
| Sharp | " | 1,495 | " medium |
| Broad shoulder | " | 1,445 | " weak |
| Broad shoulder | " | 1,400 | " weak-medium |
| Broad | " | 1,265 | " medium |
| Broad shoulder | " | 1,200 | " weak |
| Sharp shoulder | " | 1,165 | " weak |
| Sharp shoulder | " | 1,105 | " weak |
| Broad | " | 1,040 | " medium |
| Sharp shoulder | " | 910 | " medium |
| Broad shoulder | " | 880 | " weak |
| Sharp shoulder | " | 750 | " weak |

EXAMPLE 11

The procedure described in Example 1 is followed, but only 21.5 parts of ethyleneurea (0.25 mol) are used. 65 parts of water are obtained from the azeotropic distillation. Yield: 217.5 parts (80 percent strength aqueous solution). The P-content is 12.4 percent or product as such. The infrared spectrum shows the following bands:

| Broad | band at approx. | 3,240 cm⁻¹ | strong |
|---|---|---|---|
| Sharp | " | 2,910 | " weak |
| Broad shoulder | " | 2,850 | " weak-medium |
| Broad shoulder | " | 2,630 | " weak-medium |
| Broad shoulder | " | 2,460 | " weak |
| Broad shoulder | " | 2,350 | " weak |
| Sharp | " | 2,070 | " weak |
| Broad | " | 1,685 | " medium |
| Broad shoulder | " | 1,645 | " medium |
| Sharp | " | 1,495 | " medium |
| Broad shoulder | " | 1,440 | " weak-medium |
| Broad shoulder | " | 1,415 | " weak |
| Broad shoulder | " | 1,395 | " weak-medium |
| Broad shoulder | " | 1,290 | " weak-medium |
| Sharp | " | 1,265 | " weak |
| Broad | " | 1,200 | " weak |
| Sharp | " | 1,160 | " weak |
| Sharp | " | 1,040 | " strong |
| Sharp shoulder | " | 910 | " medium |
| Broad shoulder | " | 880 | " weak |
| Broad shoulder | " | 815 | " weak |
| Sharp | " | 750 | " weak |

EXAMPLE 12

Mixed fabrics of polyester/cotton (PES/CO) (67/33) are padded with the liquors according to Table 1 which follows, dried at 80° to 100°C and subsequently cured for 5 minutes at 150°C.

The fabric is then washed for 5 minutes at 60°C in a liquor which per litre contains 5 ml of hydrogen peroxide (35% strength), 3 g of sodium hydroxide solution (30% strength) and 1 g of a 25 percent strength aqueous solution of a condensation product of 1 mol of p-tert.-nonylphenol and 9 mols of ethylene oxide. Thereafter the fabric is rinsed and dried. The degree of fixing indicates the amount of the product present on the fibre material after rinsing (relative to the amount originally absorbed).

The fabrics are then washed up to 20 times for 45 minutes at 60°C in a domestic washing machine, in a liquor which contains 4 g/l of a domestic detergent (SNV 158,861 wash).

The individual fabric samples are then tested for their flameproof character (DIN 53,906 vertical test; ignition time 6 seconds).

The results are summarised in Table 1 which follows.

Table 1

| Constituents, g/l | Untreated | Treated with Liquor | |
|---|---|---|---|
| | | A | B |
| Product according to Example 1 | | 485 | — |
| Product according to Example 2 | | — | 520 |
| Dimethylolmelamine | | 96.5 | 96.5 |
| pH value of the liquor (adjusted with NaOH) | | 5.5 | 5.5 |
| Liquor uptake (%) | | 75 | 75 |
| Degree of fixing (%) | | 82 | 87 |

| Flameproof character | | Smouldering time/Tear length | |
|---|---|---|---|
| | | (seconds) | (cm) |
| After rinsing | burns | 0/9 | 0/11.5 |
| After 20 washes (60°C) | burns | 6/6.6 | — |

EXAMPLE 13

Mixed fabrics of polyester-cotton (PES/CO), 50:50 and 67:33, are padded with the liquors according to Table 2 which follows, dried for 30 minutes at 80°C and subsequently cured for 5 minutes at 150°C.

The fabric is then washed for 5 minutes at 60°C in a liquor which per litre contains 5 ml of hydrogen peroxide (35% strength), 3 g of aqueous sodium hydroxide solution (30% strength) and 1 g of a 25 percent strength aqueous solution of a condensation product of 1 mol of p-tert.-nonylphenol and 9 mols of ethylene oxide. Thereafter the fabric is rinsed and dried. The degree of fixing indicates the amount of product present on the fibre material after rinsing (relative to the amount originally taken up).

The fabrics are then washed up to 40 times for 45 minutes at 60°C in a domestic washing machine, in a liquor which contains 4 g/l of a domestic detergent (SNV 198,861 wash). The individual fabric samples are then tested for their flameproof character (DIN 53,906 vertical test; ignition time 6 seconds).

The results are summarised in Table 2 which follows.

Table 2

| Constituents, g/l | Untreated | Treated with Liquor | | | | |
|---|---|---|---|---|---|---|
| | | C | D | E | F | G |
| Product according to Example 3 | 610 | — | — | — | — | — |
| Product according to Example 4 | — | 515 | — | — | — | — |
| Product according to Example 5 | — | — | 1035 | — | — | — |
| Product according to Example 6 | — | — | — | 970 | — | — |

Table 2 -Continued

| Constituents, g/l | Untreated | Treated with Liquor | | | | |
|---|---|---|---|---|---|---|
| | | C | D | E | F | G |
| Product according to Example 7 | | — | — | — | — | 650 |
| Dimethylolmelamine | | 96.5 | 96.5 | 96.5 | 96.5 | 96.5 |
| pH value of the liquor (adjusted with NaOH) | | 5.3 | 5.5 | 5.4 | 5.4 | 5.8 |

| | Fabrics, PES : CO | | | | | | | | | | |
|---|---|---|---|---|---|---|---|---|---|---|---|
| | 50:50 | 67:33 | 50:50 | 67:33 | 50:50 | 67:33 | 50:50 | 67:33 | 50:50 | 67:33 | 50:50 | 67:33 |
| Liquor uptake, % | — | — | 75 | 75 | 75 | 75 | 75 | 75 | 75 | 75 | 75 | 75 |
| Degree of fixing,% | — | — | 71 | 73 | 73 | 71 | 68 | 71 | 68 | 78 | 75 | 78 |

| Flameproof character | | | | | | | | | | | |
|---|---|---|---|---|---|---|---|---|---|---|---|
| After rinsing | burns | | | | | | | | | | |
| smouldering time (seconds) | | 0 | 0 | 1 | 0 | 0 | 0 | 0 | 0 | 0 | 0 |
| tear length (cm) | | 9 | 10 | 9.5 | 10 | 11.5 | 11.5 | 9.5 | 13 | 10 | 11 |
| After 20 washes (60°C) | burns | | | | | | | | | | |
| smouldering time (seconds) | | 0 | 2.5 | 0 | 0 | 0 | 0 | 0 | 0 | 0 | 0 |
| tear length (cm) | | 7.5 | 9 | 9 | 10.5 | 9.5 | 9.5 | 8 | 13 | 9.5 | 11.5 |
| After 40 washes (60°C) | burns | | | | | | | | | | |
| smouldering time (seconds) | | 0 | 0 | 0 | 2 | 0 | 1 | 0 | — | 0 | 0 |
| tear length (cm) | | 6.5 | 11 | 11 | 9 | 9.5 | 11.5 | 8 | — | 8 | 9 |

The phosphorus content per kg of fabric is in each case 52 g.

EXAMPLE 14

Fabrics of polyester/cotton (PES/CO) 67:33 and 50:50, wool (W) and cotton (CO) are padded with the liquors of Table 3 and 4 below and then after-treated as follows:

a. By the thermofixing process, with subsequent washing at 40°C (W), 60°C (PES/CO) or 95°C (CO) as indicated in Example 12.

b. Partly by the ammonia fixing process: after padding, the fabrics are dried incompletely at 80°C (10–20% residual moisture), then gassed with ammonia for 10 minutes, then treated for 10 minutes in a bath which contains 300 ml of a 24 percent strength aqueous ammonia solution per litre, using a liquor ratio of 1:30, thereafter rinsed at 40°C in a bath which contains 5 g/l of soap and 6 ml/l of hydrogen peroxide (35% strength), and dried.

The fabrics are then washed up to 20 times at 40°C (W) or 60°C (PES/CO) or 95°C (CO) as indicated in Example 12, and then tested for their flameproof character according to DIN 53,906 (ignition time 6 seconds). Untreated fabrics burn away.

The results are summarised in Table 3 and 4 below.

Table 3

| Constituents, g/l | Treated and fixed according to process a) | | | | | | | | | |
|---|---|---|---|---|---|---|---|---|---|---|
| | PES/CO 67:33 | | | | | | CO | | | W |
| | H | I | J | K | L | M | N | O | P | Q | R |
| Products according to Example | | | | | | | | | | |
| 8 | 505 | 505 | | | | | 270 | 270 | | | |
| 9 | | | 845 | 845 | | | | | 453 | 453 | |
| 10 | | | | | 840 | | | | | | 690 |
| 11 | | | | | | 468 | | | | | |
| Di-trimethylolmelamine | 103 | | 103 | 103 | 103 | 96.5 | 120 | | 120 | 120 | 84.5 |
| Trimethylolmelamine-dimethyl-ether(75% strength) | | 153 | | | | | | 179 | | | |
| Condensation product* | | | | | | | | | | | 2 |
| Silicone oil emulsion (40% strength) | 35 | 35 | 35 | 35 | 35 | | 35 | 35 | 35 | 35 | 35 |

| | H | I | J | K | L | M | N | O | P | Q | R |
|---|---|---|---|---|---|---|---|---|---|---|---|
| pH of the liquor | 5.5 | 5.5 | 4.5 | 7 | 7 | 5.5 | 5.5 | 5.5 | 4.5 | 7 | 7 |
| Degree of fixing, % | 57 | 52 | 65 | 67 | 77 | 81 | 60 | 51 | 63 | 69 | 96 |
| Flameproof character: Burning time (seconds)/tear length (cm) | | | | | | | | | | | |
| After rinsing | 4/13 | 0/8 | 0/6 | 0/11 | 0/11 | 0/11** | 0/6 | 0/5.5 | 0/6.5 | 0/6 | 0/4 |
| After 1 wash | 3/12 | 0/10.5 | 0/9 | 0/7 | 0/7 | — | 0/9 | 0/10 | 0/6 | 0/5 | 0/4 |
| After 5 washes | 3.5/10 | 0/10 | 0/7 | 0/7.5 | 0/8 | 0/9** | 0/8 | 0/5.5 | 0/4 | 0/5 | 0/4 |
| After 20 washes | 3/11 | 0/11 | 0/7 | 0/7.5 | 0/5 | 0/8.5** | 0/8 | 0/7 | 0/4 | 0/5.5 | 0/3 |

*Condensation product of 1 mol of p-tert-nonylphenol and 9 mols of ethylene oxide.
**Flameproofing test carried out after rinsing and after 20 and 40 washes.

Table 4

| Constituent, g/l | Treated and fixed according to process (b) | | | |
|---|---|---|---|---|
| | PES/CO 67:33 | | CO | |
| | S | T | U | V |
| Product according to Example 8 | 505 | 505 | 270 | 270 |
| Di-trimethylolmelamine | 120 | | 120 | |
| Trimethylolmelamine-dimethyl-ether (75% strength) | | 153 | | 153 |
| Silicone oil emulsion (40%) | 35 | 35 | 35 | 35 |
| pH of the bath | 5.5 | 5.5 | 5.5 | 5.5 |
| g of phosphorus/kg of fabric | 57 | 57 | 35 | 35 |
| g of nitrogen/kg of fabric | 30 | 30 | 40 | 40 |
| Flameproof character: burning time(seconds)/tear length (cm) | | | | |
| After rinsing | 0/9.5 | 0/11 | 0/7 | 0/5 |
| After 1 wash | 0/9 | 0/9 | 0/4 | 0/5.5 |
| After 5 washes | 0/8.5 | 0/9 | 0/6 | 0/4.5 |
| After 20 washes | 0/8 | 0/8.5 | 0/6 | 0/7 |

EXAMPLE 15

A fabric of pure polyester is padded with the following liquor:

825 g/l of product according to Example 10
120 g/l of di-trimethylolmelamine
35 g/l of silicone oil emulsion (40% strength)
pH value: 7
Degree of fixing: 79%

After padding, the fabric is dried at 80° to 100°C and thereafter condensation is carried out for 5 minutes at 150°C. The fabric is then washed for 5 minutes at 40°C in a bath which contains 4 g/l of sodium carbonate and 1 g/l of a condensation product of 1 mol of p-tert.-nonylphenol and 9 mols of ethylene oxide, rinsed and dried.

The flameproofing test according to DIN 53,906 (ignition time 6 seconds) gives the following values:

Burning time: 2 seconds
Tear length: 13.5 cm

Untreated polyester fabric burns away.

We claim:

1. A process for flameproofing organic fiber material of a blend of polyester-cellulose, comprising the sequential steps of treating the material with an aqueous preparation which consists essentially of (1) a water-soluble condensation product obtained by condensing a tetrakis-(hydroxymethyl)-phosphonium salt or hydroxide at 40 to 120°C with 0.02 to 0.5 molar equivalent of a cyclic urea of the formula:

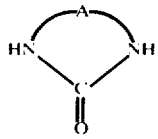

wherein
A is a radical of the formula
—CH$_2$CH$_2$—, —CH$_2$CH$_2$CH$_2$—, —CHOH—CHOH—, —CHOX—CYZ—CH$_2$, —CH$_2$—NR—CH$_2$—
or —CH—NH—CO—NH—CH—
wherein
X denotes hydrogen, alkyl with 1 to 4 carbon atoms, hydroxyalkyl with 2 to 4 carbon atoms or alkoxyalkyl with 1 to 4 carbon atoms in the alkoxy part and 2 to 4 carbon atoms in the alkyl part, Y and Z each denote alkyl with 1 to 4 carbon atoms and R denotes alkyl or hydroxyalkyl with 1 to 4 carbon atoms; and (2) a polyfunctional aminoplast precondensate, and curing the treated material by heating the treated material for about 30 seconds to about 10 minutes, at a temperature in the range of about 100°C to 200°C after a drying step.

2. The process of claim 1, wherein the water-soluble condensation product is obtained by condensing a tetrakis-(hydroxymethyl)-phosphonium salt, ethyleneurea, and methylolmelamine.

3. The process of claim 1, wherein the condensation product is obtained by condensing a tetrakis-(hydroxymethyl)-phophonium salt or hydroxide with a cyclic urea in the presence of an inert organic solvent.

4. The process of claim 1, wherein the molar equivalent of the cyclic urea is in the range of 0.1 to 0.3.

5. The process of claim 1, wherein the tetrakis-(hydroxymethyl)-phosphonium salt is a tetrakis-(hydroxymethyl)-phosphonium halide.

6. The process of claim 1, wherein the cyclic urea is methylolated before the condensation.

7. The process of claim 1, wherein A is a radical of the formula —CH$_2$CH$_2$—, —CH$_2$CH$_2$CH$_2$—, —CHOH—CHOH—, —CHOX—CYZ—CH$_2$, —CH$_2$—NR—CH$_2$— or —CH—NH—CO—NH—CH—
wherein
X denotes hydrogen, alkyl with 1 to 4 carbon atoms, hydroxyalkyl with 2 to 4 carbon atoms or alkoxyalkyl with 1 to 4 carbon atoms in the alkoxy part and 2 to 4 carbon atoms in the alkyl part, Y and Z each denote alkyl with 1 to 4 carbon atoms and R denotes alkyl or hydroxyalkyl with 1 to 4 carbon atoms.

8. The process of claim 1, wherein the cyclic urea is ethyleneurea.

9. The process of claim 1, wherein the cyclic urea is N,N'-dimethylolglyoxalurea.

10. The process of claim 1, wherein the condensation is carried out in the presence of formaldehyde.

11. The process of claim 1, wherein the condensation product is at least partially etherified with an alkanol of 1 to 4 carbon atoms.

12. The process of claim 1, wherein the condensation product is obtained by further condensation at a temperature of 100° to 150°C.

13. The process of claim 3, wherein the inert organic solvent includes an aromatic hydrocarbon.

14. Organic fiber material of a blend of polyester-cellulose which has been provided with a flameproofing finish by a process comprising the sequential steps of treating the material with an aqueous preparation which consists essentially of (1) a water-soluble condensation product obtained by condensing a tetrakis-(hydroxymethyl)-phosphonium salt or hydroxide at 40° to 120°C with 0.02 to 0.5 molar equivalent of a cyclic urea of the formula:

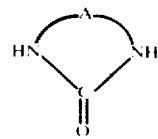

wherein

A is a radical of the formula —CH$_2$CH$_2$—, —CH$_2$CH$_2$CH$_2$—, —CHOH—CHOH—, —CHOX—CYZ—CH$_2$, —CH$_2$—NR—CH$_2$— or —CH—NH—CO—NH—CH— wherein

X denotes hydrogen, alkyl with 1 to 4 carbon atoms, hydroxyalkyl with 2 to 4 carbon atoms or alkoxyalkyl with 1 to 4 carbon atoms in the alkoxy part and 2 to 4 carbon atoms in the alkyl part, Y and Z each denote alkyl with 1 to 4 carbon atoms and R denotes alkyl or hydroxyalkyl with 1 to 4 carbon atoms; and (2) a polyfunctional aminoplast precondensate, and curing the treated material by heating the treated material for about 30 seconds to about 10 minutes, at a temperature in the range of about 100°C to 200°C after a drying step.

* * * * *

UNITED STATES PATENT AND TRADEMARK OFFICE
CERTIFICATE OF CORRECTION

PATENT NO. : 3,901,985
DATED : August 26, 1975
INVENTOR(S) : HERMANN NACHBUR ET AL It is certified that error appears in the above-identified patent and that said Letters Patent are hereby corrected as shown below:

Column 15, claim 1, line 66, delete "N- H" and substitute --- NH ---.

Column 16, claim 3, line 18, delete "phophonium" and substitute --- phosphonium ---.

Column 16, claim 7, line 30, delete "-CH-NH-CO-NH-CH-" and substitute --- $\overline{\text{-CH-NH-CO-NH-CH-}}$ ---.

Column 17, claim 14, lines 4 and 5, delete "-CH-NH-CO-NH-CH-" and substitute --- $\overline{\text{-CH-NH-CO-NH-CH-}}$ ---.

Signed and Sealed this twenty-seventh Day of April 1976

[SEAL]

Attest:

RUTH C. MASON
Attesting Officer

C. MARSHALL DANN
Commissioner of Patents and Trademarks